Patented Aug. 15, 1939

2,169,244

UNITED STATES PATENT OFFICE

2,169,244

FERMENTATION PROCESS

Frank M. Hildebrandt, Baltimore, and Norris M. Erb, Riviera Beach, Md., assignors to U. S. Industrial Alcohol Co., New York, N. Y., a corporation of West Virginia No Drawing. Application June 30, 1937, Serial No. 151,177

4 Claims. (Cl. 195—37)

This invention has to do with an improvement in the process of fermentation of sugar solutions by yeast, with special reference to blackstrap or other molasses. The use of molasses, blackstrap more particularly, is advantageous because of the cheapness of the material. The invention is applicable as well to the fermentation of other sugar solutions. Before describing the procedure by which the improvement is brought about, it is desired to call attention to several well-known facts in connection with the yeast fermentation.

The yeast cell, like other living organisms, has a complex relation to its environment. It metabolizes food substances under suitable conditions and an equally important phase of its activity is the production of new cells. It is well known that this is accomplished in the case of yeast by a budding process, and those who have had experience with fermentation processes are familiar with the conditions under which such budding takes place. For instance, it is known that a great many more yeast cells are formed per gram of sugar in dilute solutions than in concentrated solutions. It is also well known that the presence of oxygen markedly increases the multiplication of yeast. This fact was brought out by Pasteur, who observed an increase in cell formation in a nutrient solution exposed to the air in a thin layer over that observed when it was exposed in a thick layer. For many years this fact has been utilized in the production of baker's yeast by blowing large quantities of air through the growing solution. It is desirable to have suitable nitrogenous food present and to regulate such factors as acidity, temperature, etc. so as not to interfere with the multiplication of the yeast. The limits within which these factors may be varied are well known to those skilled in the art.

The transformation of sugar to ethyl alcohol carried out by yeast is of great importance commercially. While alcohol production can not be entirely divorced from the multiplication of the cells, it is possible for it to take place under conditions which would entirely prevent multiplication. This sugar transforming function is primarily enzymatic and may even be produced by juice from the cells when such juice has been prepared under conditions which eliminate the possibility of any actual living yeast being present. This function is the one which is of value to the producer of alcohol and processes for the manufacture of alcohol have been set up so as to transform as large a sugar concentration as it has been possible to use heretofore with the greatest possible yield per gram of sugar. So far as we are aware practical operations have depended upon effecting the main yeast multiplication and the alcohol production in one and the same stage. We have addressed ourselves to an important fact, namely that the multiplication or growth phase of the yeast is much more sensitive to unfavorable conditions than the alcohol-producing or enzymatic phase.

In the production of ethyl alcohol by fermentation as practiced heretofore it is necessary to build up a considerable quantity of yeast to carry through the sugar conversion in the large volume of mash of the actual alcohol-producing step of the process. This has been done by setting up small seed fermentations of successively larger volumes in which the yeast is allowed to propagate and finally using the last stage of this seed series to inoculate a large mash which contains the maximum amount of sugar that the yeast can tolerate and ferment with efficiency for the production of alcohol. A volume ratio of about one part seed to 25 parts of this mash is commonly employed, and multiplication of the yeast cells in the mash where the alcohol is made is relied on to "populate" the same mash. The present processes are weak in that they call for multiplication of the yeast cells in a type of solution which is not suitable for this multiplication. That is to say, the alcohol manufacturing fermentation is carried out in the presence of a relatively large amount of sugar and under practically anaerobic conditions, which are unsuited for the multiplication phase of the yeast. As a consequence, one must make sacrifices in respect to alcohol production and cost of operation in order that there may be a compromise which will permit the yeast to carry out its necessary functions of growth and multiplication. If the sugar concentration is raised beyond about 15 grams per 100 grams of mash, it is inefficiently utilized and the fermentation time is unduly extended.

The purpose of the process covered herein is to modify the yeast fermentation of sugar solutions, and specifically the ethyl fermentation, in a way that will make possible multiplication of the yeast cells under very favorable conditions and then follow this step by an adjustment of the mash for maximum alcohol production. Briefly, the method involved is as follows:

The fermentation is carried out in two stages, in the first of which the mash is so constituted that the yeast cells grow and multiply under optimum conditions for this particular phase of their life cycle. Seed yeast cultured in the usual way is added to this mash. In this yeast-growing stage the fermentation vessel is filled about two-thirds full with a suitable nutrient solution of low sugar concentration. Air is used to supply an excess of oxygen and a large amount of nitrogen relative to the sugar is supplied either in the form of ammonium salts or other suitable nitrogenous yeast food. Having secured an adequate crop of yeast it is then practicable to add to the mash an amount of sugar considerably larger than could otherwise be used, and carry through the alcohol production phase under more economic operating conditions. In the second phase, the mash is not oxygenated and it is only necessary to take care that the temperature does not become excessive and that there is no violently toxic material used in the mash. It should be emphasized that the advantage of this procedure lies in the fact that the sensitive yeast multiplication and growing phase has been passed through in the first stage and thus a much more desirable operation can be obtained in the second stage. As the process is carried out, a sufficiently large yeast crop is grown in the fermentation vessel to ferment adequately all the sugar that is thereafter added. Thus, it is possible to make conditions good for multiplication in order to propagate the yeast in the first part of the fermentation and in the second part to take full advantage of the alcohol producing power of this pre-grown yeast.

In using molasses for alcohol production one deals with a material containing large amounts of mineral salts. Also, the molasses contains many by-products formed during the sugar extraction process. Nevertheless, these materials are not toxic to yeast and fairly high concentrations of sugar may be used even under present processes where both the multiplication of the yeast and the transformation of sugar to alcohol are carried out in a single step. It is often desirable in molasses fermentation plants to put back into the freshly prepared mashes a certain portion of the still residue from previous fermentation. This is a well known procedure in all distilleries and is usually termed "slopping back". The quantity of slop put into the fresh mash is limited at present by the fact that when the solids of the slop are added to the mash a point is soon reached beyond which one can not go because of the additive effect of the sugar and the salts and other materials in the molasses. However, we have discovered that if the fermentation is carried out as noted above, in two stages, it is possible to grow a good crop of yeast in slop alone, to which no sugar has been added or to which only a small quantity of sugar has been added. The reason that this is possible is that the slop contains a certain amount of unused sugar from the previous fermentation which suffices for growth even though no more sugar is added. It is, therefore, possible to utilize this sugar by a two-stage fermentation and thus obtain a better over-all efficiency on the total sugar input than could otherwise be obtained. An additional advantage results from the fact that by producing the crop in the still residue, the yeast cells are acclimatized to the molasses solution, and since they carry out their sensitive multiplication stage in a favorable medium can tolerate much larger quantities of sugar for the main alcoholic phase of their activity. The slop contains not only residual sugar from the preceding fermentation but also contains extractives from dead yeast cells and a desirable combination of mineral salts, all of which combine to make it a good growing medium, if used without large amounts of additional sugar.

In a specific aspect the invention consists in setting up a preliminary yeast-growing fermentation in the still residue or "slop" and in following this by the addition of undiluted or diluted molasses for the production of alcohol. This procedure is especially valuable where disposal of the residue is a problem, since such disposal always involves concentration of the residues as a first step to chemical treatment or as a preliminary step to burning if the recovery of fertilizer salts is the goal to be attained. Obviously, one can not utilize residues to the entire exclusion of dilution water because of the fact that there would be a gradual accumulation of solids which would ultimately stop the fermentation completely. It is possible, however, to at least double the amount of residue with no loss in fermentation efficiency. In fact, a better efficiency is obtained by this method, especially from the higher concentrations of sugar. This may be due to the fact that the sugar necessary for yeast growth has been obtained, free of charge, as unfermented sugar in the residue from a preceding fermentation. In addition there is, of course, a large saving in the cost of concentration, since the amount of water added to the main mash is much decreased. The process enables us to use about 60% of the residue, instead of around 20% as would be possible under ordinary processes. As an example of the manner in which the present fermentation may be carried out, the following example is given:

Still residue from an ethyl fermentation containing 1.5 grams of residual sugar per 100 cc. is seeded with a small quantity of yeast, say from 0.1% to 2% by volume. This mash is then aerated for a period of from twelve to twenty hours or as long as is necessary to produce maximum yeast growth. The nitrogenous food may be increased if necessary by the addition of ammonium salts or ammonia. At the end of the aeration period it will be found that a large number of healthy yeast cells are visible under the microscope. At this time, molasses is added in quantities sufficient to build up the sugar of the mash to a concentration of from 18.00 to 20.00 grams per 100 cc. The added molasses may be diluted if desired. The air is turned off and the alcoholic phase of the operation is allowed to go to completion. Since no further yeast multiplication is necessary, this second phase proceeds rapidly and the total time is no longer than would have been required for a lower sugar concentration fermented by the usual method. Alcohol concentrations of 10 to 12 cc. per 100 cc. of the mash may be built up without loss of time or efficiency.

The advantage of this procedure may be illustrated by the following runs which show that the yeast is not adversely affected by the high sugar concentrations when a two-stage fermentation of the type described is carried out. These are typical of a number of experiments designed to show the effect of high sugar. Not only is it possible to use these high concentrations but the fermentation efficiency actually increases with the sugar concentration up to about 20 grams of sugar per 100 grams of mash.

| Experiment No. | Grams sugar per 100 grams mash | Fermentation efficiency |
| --- | --- | --- |
| | | Percent |
| 1 | 12.57 | 83.7 |
| 2 | 17.01 | 86.6 |
| 3 | 19.22 | 87.7 |

The illustration given below will show the advantage of the described operation over the usual type of operation and shows further how this increases as the sugar concentration of the mash increases.

| Experiment No. | Sugar concentration—grams per 100 grams mash | Increased alcohol production obtained by process described |
| --- | --- | --- |
| | | Percent |
| 1 | 9.55 | 0.1 |
| 2 | 12.59 | 0.3 |
| 3 | 14.83 | 0.8 |
| 4 | 17.06 | 2.1 |
| 5 | 18.54 | 4.6 |
| 6 | 20.02 | 6.2 |

The procedure with which the two-stage runs were compared here was the usual method where a seed yeast representing 4% by volume of the final mash was employed as a starter for the alcohol-producing fermentation. The new procedure also enabled the fermentation to go to completion in a normal time while the higher sugars handled according to the old method required about 50% longer.

While the invention is particularly advantageous when carried out with the use of distillery slop in the first stage and molasses added in the second stage, it is applicable more generally to the growth of all or the major portion of the yeast required for alcohol production, in an aerated mash of low sugar concentration, followed by the addition of material of relatively high sugar concentration, to supply the sugar for the principal yield of alcohol.

This application relates more specifically to the production of ethyl alcohol, but by modification of the process as disclosed in our copending application Serial No. 151,178 it is applicable also to the production of substantial amounts of glycerol with ethanol.

We claim:

1. A process of yeast fermentation of sugar solutions for production of alcohol, which process is conducted in two stages and comprises: inoculating a mash of low sugar concentration with yeast, aerating this mash until substantially all the yeast crop for the subsequent stage of the process is grown, then increasing the sugar content of the mash to over 15 grams of sugar per 100 cc. of mash, stopping the aeration, and allowing the fermentation for alcohol to go to completion.

2. A process of yeast fermentation of sugar solutions for production of alcohol, which process is conducted in two stages and comprises: inoculating with yeast a mash containing, as a source of sugar, fermentation still residue, aerating this mash until substantially all the yeast crop for the subsequent stage of the process is grown, then increasing the sugar content of the mash to over 15 grams of sugar per 100 cc. of mash, stopping the aeration, and allowing the fermentation for alcohol to go to completion.

3. A process of yeast fermentation of molasses mash for production of alcohol, which process is conducted in two stages and comprises: inoculating with yeast a mash containing, as a source of sugar, still residue from a molasses fermentation, aerating this mash until substantially all the yeast crop for the subsequent stage of the process is grown, then increasing the sugar content of the mash to upwards of 15 grams of sugar to 100 cc. of mash by adding molasses, stopping the aeration, and allowing the fermentation for alcohol to go to completion.

4. A process as set forth in claim 1, in which the mash in which the yeast crop is grown contains less than 3 grams of sugar per 100 cc. of mash.

FRANK M. HILDEBRANDT.
NORRIS M. ERB.